United States Patent [19]

Tsukane et al.

[11] Patent Number: 4,831,608

[45] Date of Patent: May 16, 1989

[54] MULTI-LAYER HIGH DENSITY INFORMATION RECORDING CARRIER HAVING A NON-ALKALI INORGANIC GLASS PROTECTIVE LAYER

[75] Inventors: Nagayoshi Tsukane; Masaru Sato, both of Himeji, Japan

[73] Assignee: Daicel Chemical Industries, Ltd., Osaka, Japan

[21] Appl. No.: 119,213

[22] Filed: Nov. 6, 1987

Related U.S. Application Data

[63] Continuation of Ser. No. 702,775, Feb. 19, 1985, abandoned.

[30] Foreign Application Priority Data

Feb. 22, 1984 [JP] Japan .................. 59-32230

[51] Int. Cl.⁴ .............................................. G11B 7/24
[52] U.S. Cl. ................................. 369/14; 346/135.1; 369/288; 369/275; 369/286
[58] Field of Search ................... 369/14, 13, 275, 284, 369/286, 288; 430/945, 961; 365/122; 360/59, 114; 428/412, 64, 65; 346/76 L, 135.1

[56] References Cited

U.S. PATENT DOCUMENTS

| | | | |
|---|---|---|---|
| 3,645,779 | 2/1972 | Kienel | 428/412 |
| 4,186,221 | 1/1980 | Hall et al. | 428/412 |
| 4,403,231 | 9/1983 | Ando et al. | 346/135.1 |
| 4,417,290 | 11/1983 | Tanaka et al. | 369/13 |
| 4,449,138 | 5/1984 | Ando | 346/76 L |

FOREIGN PATENT DOCUMENTS

| | | | |
|---|---|---|---|
| 0111988 | 6/1984 | | |
| 0139474 | 5/1985 | European Pat. Off. | 365/122 |
| 57-172539 | 10/1982 | Japan | |
| 8200393 | 9/1982 | Netherlands | 369/284 |
| 1313866 | 4/1973 | United Kingdom | |
| 2047420 | 11/1980 | United Kingdom | 369/284 |

Primary Examiner—Alan Faber
Assistant Examiner—Hoa T. Nguyen
Attorney, Agent, or Firm—Armstrong, Nikaido, Marmelstein, Kubovcik & Murray

[57] ABSTRACT

An optical information recording carrier comprising a substrate made of transparent plastic, a high density information recording layer formed on said substrate, and a thin film layer made of inorganic glass and formed between said substrate and said high density information recording layer.

4 Claims, 1 Drawing Sheet

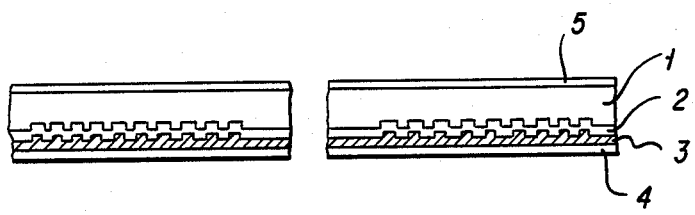
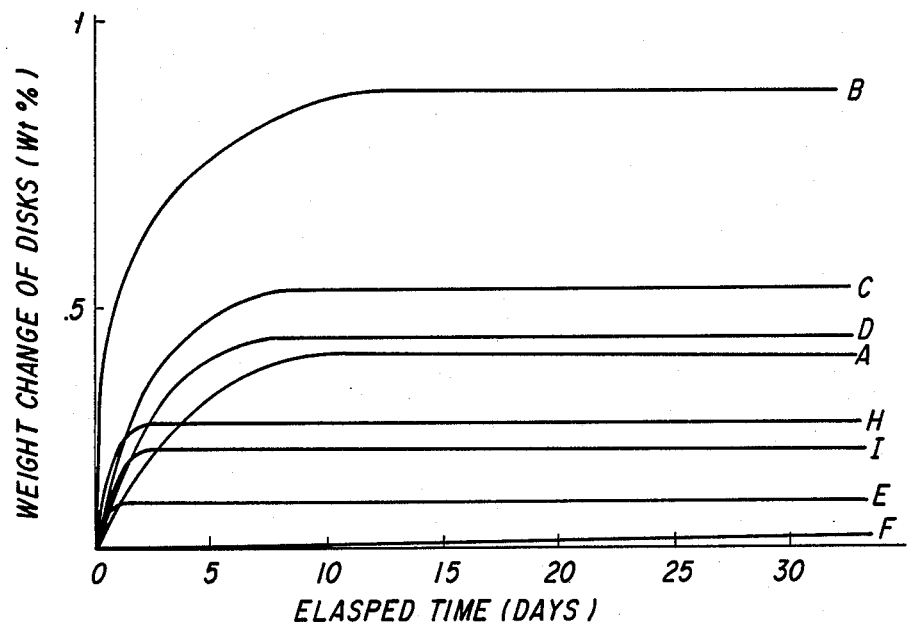

MULTI-LAYER HIGH DENSITY INFORMATION RECORDING CARRIER HAVING A NON-ALKALI INORGANIC GLASS PROTECTIVE LAYER

This application is a continuation Ser. No. 702,775 filed Feb. 19, 1985 and now abandoned.

BACKGROUND OF THE INVENTION

1. Field of the Invention

This invention concerns a high density information recording carrier for use in an optical recording and reproducing apparatus for recording and reproduction of information by the use of laser beams. More specifically, it relates to a high density information recording carrier made of plastic having excellent durability and further to a high density information recording carrier for magneto-optic recording and reproduction excellent in magneto-optic characteristic.

2. Description of the Prior Art

Optical information recording carriers include those discs exclusively used for reproduction such as video discs and digital audio discs, so called DRAW discs which are capable of writing, and further so called E-DRAW discs which are capable of writing, erasing and writing such as magneto-optic discs. They are produced or manufactured by a method of preparing a stamper from an original disc engraved with signals or guide tracks, molding a copy disc made of plastic from the stamper to obtain a plastic substrate having a surface containing signals or guide tracks, and forming various types of functional membranes thereon. The signals contained in the recording surface comprise those bits corresponding to digital signals or analog signals in the case of read-only memory discs, and bits and guide tracks corresponding to signals for use in addressing and error correction in the case of above-mentioned DRAW and E-DRAW discs. Each bit has a width of $0.5-0.8\mu$, a length of $0.5-2.0\mu$ and a depth of $0.06-1.2\mu$ and each guide groove has, respectively, $0.5-1.0\mu$ width and $0.06-1.2\mu$ depth. They are disposed in a single or multiple stages. As a functional membrane, in the case of the read-only memory discs, a reflecting metal membrane, such as aluminum, is coated at the recording surface of the plastic substrate by the method of vapor depositioning, sputtering or ion-plating and in the case of DRAW discs, aluminum, chromium, lead, gold, rhodium, zinc, copper, antimony, tellurium, indium, bismuth, carbon disulfide - tellurium, tellurium carbide, tellurium arsenide, thin pigment membrane, silver plus polymer or the like is coated as a recording medium. Further, in the case of the E-DRAW discs, phase transformable material such as tellurium oxide, a magnetic membrane made of manganese—bismuth, gadolinium—cobalt, iron—terbium, iron—terbium—gadolinium, or iron—terbium—cobalt, or a semiconductor membrane such as of arsenic—selenium—sulfur—germanium is coated on a plastic substrate by the method of vapor depositioning, sputtering, ion-plating or the like. Usually metal, for the purpose of reflection and/or inorganic material such as silicon oxide or polymeric material such as of acryl or epoxy, for the purpose of protection, is often coated further on the above-mentioned metal material.

Generally, the above-mentioned functional membranes are usually formed on a glass substrate by the method of sputtering or vapor deposition. Such a glass material is used as the substrate, because it exhibits:

(1) high optical transmittance,
(2) high heat conduction and low heat expansion coefficient.
(3) no hygroscopic deformation at all, and
(4) good bondability with the recording layer and others.

However, it is difficult to machine, heavy, easy to crack, difficult to provide with guide tracks and poor in mass productivity.

On the other hand, plastics such as polymethylemethacrylate and polycarbonate are preferable for the substrate for information recording discs with their optical transmittance of about 90 percent and can be produced as inexpensive substrates in a great quantity by the method of injection molding or the like.

However, these plastic substrates are relatively soft, have a considerable heat expansion coefficient and, in addition, exhibit relatively large hygroscopic deformation. Particularly, the hygroscopic deformation results in a serious problem in the optical recording and reproduction of information. Further, owing to gas permeability, it is inevitable that the recording layer will deteriorate by oxidation due to oxygen permeating through the substrate. In order to eliminate the above drawbacks, organic silanes are coated or oxides such as $SiO_2$ are formed through sputtering or the like on the substrate; however, none of them has been quite satisfactory. Because it is necessary for the organic silanes to be immersed or spin coated by using a solvent and, thereafter, cured at about 90° C., it causes deformation to the plastic substrate. While on the other hand, formation of inorganic oxides such as $SiO_2$ through sputtering brings about the generation of pin holes which make it difficult to completely defeat the introduction of moisture and oxygen.

SUMMARY OF THE INVENTION

A durable plastic high-density-information recording layer is provided for use in optical recording-and-reproducing by laser beams. The recording layer of this invention has an excellent magneto-optic property.

An object of this invention is to provide an optical information recording carrier which is stable for a long time, with a view to overcome the foregoing problems in the prior art, by making the plastic substrate glass-like thereby improving the smoothness, hardness, hygroscopic deformation and gas permeability to thereby prevent the degradation of the functional membranes caused from the substrate.

Another object of this invention is to provide an optical information recording carrier with significantly improved magneto-optic characteristic in a magneto-optic recording carrier using rare earth—transition metal amorphous alloy as the functional membrane.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is a cross-sectional view of the conceptional structure of an optical disc; and FIG. 2 is a graph showing the relationship between the increment, in the weight (wt %), of the optical disc and the days elapsed under the condition of 45° C. and 90 RH%, in which each of curves A–I shows the symbol of the sample indicated in Table 1.

DESCRIPTION OF THE PREFERRED EMBODIMENT

First, explanation is to be made for the structure of a high density information recording carrier for use in the optical information recording system (hereinafter referred to as "an optical disc").

FIG. 1 shows the general structure of an optical disc, which comprises a substrate 1 made of transparent plastic, a protection layer 2, a recording medium layer 3, a surface protection layer 4 and, optionally, an outer surface protection layer 5.

Although the above-mentioned substrate 1 may be prepared from any transparent plastic such as acrylic resin, polycarbonate resin, styrenic resin, vinyl chloride resin or the like, the acrylic resin and the polycarbonate resin are generally preferred in view of lower birefringence and higher moldability and stability.

Any known medium for use in DRAW and E-DRAW discs may be used as the high density information recording medium layer 3.

While oxides such as $SiO_2$ and $TiO_2$ or organic polymers such as organo siloxane have heretofore been used as the protection layer 2, it is a feature of this invention to use inorganic glass rather than inorganic oxides such as $SiO_2$ alone, as the protection layer 2.

The thickness of the inorganic glass layer 2 can be between 100–2000 Å. If the thickness is less than 100 Å, no sufficient protection can be obtained and, on the other hand, if it is more than 2000 Å, it provides an economical disadvantage, a problem of absorption of laser beams or the like. The inorganic glass layer 2 can be formed by the method of physical vapor deposition (PVD) such as vapor deposition, sputtering and ion-plating.

Non-alkali glass is particularly preferred as the inorganic glass. Non-alkali glass is commercially available, for example, Corning Glass Works, Code No. 7059, which contains a composition of $SiO_2$: 49.9%, BaO: 25.1%, $B_2O_3$: 10.5%, $Al_2O_3$: 10.3% and CaO: 4.3%. However, the inorganic glass for use in this invention is not limited only thereto but any material may be used so long as it can be formed into a thin film by means of the physical vapor deposition method.

The inorganic glass layer in this invention may be used not only as the protection layer between the plastic substrate 1 and the recording layer 3, but also as the outer protection layer 4 on the outer surface of the recording layer 3 and, further, it may also be used as the outer surface protection layer 5 for the plastic substrate 1.

The inorganic glass layer in this invention exhibits excellent properties, in particular, hygroscopic resistance over the conventional protection membranes made of $SiO_2$, $TiO_2$ or the like as shown in the examples described below.

The second feature of this invention resides in that the high density information recording layer is made of rare earth—transition metal amorphous alloy.

That is, in view of the necessity of higher density and high speed access resulted by the recent increase in the amount of information, the layer of amorphous alloys in combination of rare earth metal and transition metal such as TbFe, TbFeCo and GdTbFe have remarkably attracted attention as the high density information recording medium capable of recording, reproduction and erasing with an easy magnetization axis along the vertical direction with respect to the surface of the membrane. The information recording discs as described above have such application as in document files, video files, movie memories and computer memories, in which reduction in the error rate and improvement in the SN ratio are the important problems for the increase in the accuracy thereof.

Among the factors which cause the foregoing problems, those fundamental factors attributable to the recording medium include:

(1) non-uniformity of the film thickness and alloy composition;
(2) non-uniformity of the magnetic property; and
(3) oxidative degradation.

These factors, depending much upon the purity, smoothness or scratches on the substrates, may cause an obstacle to the high performance of information recording discs.

The above factors (1)–(3) can be overcome altogether by forming the inorganic glass layer 2 of this invention between the plastic substrate 1 and the recording medium layer 3 made of the rare earth—transition metal amorphous alloy and a practical magneto-optic recording carrier (hereinafter referred to as "magneto-optic disc") can be obtained.

The magneto-optic recording medium to which this invention is applicable may be of any known rare earth—transition metal amorphous alloys and can include, for example, Tb-Fe type alloy (Japanese Pat. Publication No. 20691/1982), Dy-Fe type alloy (Japanese Pat. Publication No. 20692/1982), Gd-Tb-Fe type alloy (Japanese Pat. Laid-Open No. 126907/1981), Gd-Tb-Dy-Fe type alloy (Japanese Pat. Laid-Open No. 94948/1982), Gd-Co (Japanese Pat. Laid-Open No. 121719/1979) and Tb-Fe-Co type. It is preferred to form these rare earth—transition metal amorphous layers on the inorganic glass layer of this invention by means of vapor deposition, sputtering, ion-plating method or the like. The thickness of the amorphous layer is generally between 500–1500 Å.

The composition and the thickness of the inorganic glass layer of this invention are the same as those described above.

Prior studies have mainly been directed to the formation of an amorphous layer on a glass plate and the vertically magnetizable amorphous layer has been formed stably on the glass plate. However, it has been impossible or very difficult to form a stable amorphous layer capable of vertical magnetization on the plastic substrate. That is, although Kerr rotation angle of 0.3 degree or larger can be obtained on the glass substrate, the Kerr rotational angle, on the plastics substrate, is only of about 0.1 degree. If those with the Kerr rotational angle of 0.2 degree or larger can incidentally be obtained, they are poor in the long time stability and lack in reproduction ability. Accordingly, it has been highly desired to establish a technique capable of forming a stable, vertically magnetizable amorphous on a plastic substrate to handle with ease, instead of on conventional glass or aluminum substrate.

The present invention enables the production of a practical magneto-optical disc using a plastic substrate which used to be unable to form a stable amorphous layer thereupon by providing an inorganic glass layer 2 thereupon to thereby produce the same surface of a glass substrate.

The magneto-optic disc according to this invention shows substantially the same C/N ratio as the conventional magneto-optic disc using the glass substrate.

While this invention will now be described with reference to a magneto-optic disc as an example, this invention is similarly applicable to other known DRAW-type discs. The magneto-optic medium has been selected here as the sample, because a much more severe property, particularly, a moisture-proof property, is required than the DRAW-type medium and, accordingly, if it can satisfy the requirement for the magneto-optic recording medium, it will be sufficiently applied to the DRAW-type medium.

Hereinafter, this invention will now be described referring to the examples.

Example 1

An inorganic glass layer with a film thickness of 500 Å was formed on a substrate made of polymethylmethacrylate with 1.2 mm thickness, by using a glass target comprising non-alkali glass of Corning Glass Works, Code No. 7059 (Composition: $SiO_2$: 49.9%, $B_2O_3$: 10.5%, CaO: 4.3%, BaO: 25.1%, $Al_2O_3$: 10.3%) and, using a sputtering device (manufactured by Nippon Shinku Gijutsu K.K., RF Magnetron Sputtering Device,, an inorganic layer with a thickness of 500 Å was formed. A recording medium layer composed of $Gd_{0.12}Tb_{0.76}$ was further formed to a thickness of 1000 Å on the inorganic glass layer by using the above-mentioned sputtering device, and an outer surface protection layer (1000 Å) composed of non-alkali glass of Corning Glass Works was further formed thereupon in the same manner as described above.

As shown in Table 1 and FIG. 2, the results obtained were significantly better than those of conventional protection layer made of $TiO_2$ and $SiO_2$.

Example 2

A magneto-optic disc was prepared in the same manner as in Example 1 above, except for replacing the transparent plastic material with polycarbonate. As shown in Table 1 and FIG. 2, the results obtained were better than those using the acrylic substrate in Example 1 and conventional $TiO_2$ and $SiO_2$.

Example 3

An outer surface protection layer (1000 Å) made of the same non-alkali glass of Corning Glass Works, Code No. 7059, was further formed in the same manner as described above to the outer surface of the polycarbonate substrate at the opposite side to the recording medium layer of the magneto-optic disc as prepared in Example 2.

As to the properties of the magneto-optic disc thus obtained, the long time stability and magneto optical property were further improved as shown in Table 1 and FIG. 2.

Comparative Examples 1–5

Magneto-optic discs were prepared in the same manner as in Examples 1 and 2 except for forming known $TiO_2$ and $SiO_2$, instead of the inorganic glass layer of this invention, on the substrate of polymethylmethacrylate and polycarbonate in the layer structure as is shown in Table 1.

As shown in Table 1 and FIG. 2, the properties of the magneto-optic discs obtained were inferior to those of this invention.

TABLE 1

| | | Optical disc layer structure | | | | | | | | |
|---|---|---|---|---|---|---|---|---|---|---|
| Sample No. | Outer surface protection layer | Substrate | Intermediate protection layer | Recording medium | Surface protection layer | Transmittance (%) | Pencil hardness | Bondability | Water absorption variation (wt %) | C/N variation (%) |
| A Example 1 | — | PMMA | glass | Am | glass | 89 | 6H | | 0.4 | 87 |
| B Comparative example 1 | — | PMMA | — | Am | $TiO_2$ | 92 | 5H | Δ | 0.85 | 20 |
| C Comparative example 2 | — | PMMA | $TiO_2$ | Am | $TiO_2$ | 90 | 5H | Δ | 0.55 | 50 |
| D Comparative example 3 | — | PMMA | $SiO_2$ | Am | $SiO_2$ | 90 | 5H | Δ | 0.45 | 50 |
| E Example 2 | — | PC | glass | Am | glass | 89 | 6H | | 0.08 | 90 |
| F Example 3 | glass | PC | glass | Am | glass | 88 | 6H | | 0.02 | 100 |
| G Blank | — | PC | — | — | — | 90 | HB | — | 2.5 | — |
| H Comparative example 4 | — | PC | $TiO_2$ | Am | $TiO_2$ | 89 | 5H | Δ | 0.25 | 70 |
| I Comparative example 5 | — | PC | $SiO_2$ | Am | $SiO_2$ | 89 | 5H | Δ | 0.20 | 70 |

Note:
1. In the column of the layer structure - Glass = non-alkali glass of Corning Glass Works, Code No. 7059
PMMA = polymethylmethacrylate
PC = polycarbonate
AM—amorphous alloy ($Gd_{0.12}Tb_{0.12}Fe_{0.76}$)
2. Pencil hardness - hardness of the substrate or protection layer
3. Bondability - 10 × 10 cm area of the protection layer was grooved using a cutter to divide it into 100 meshed unit sections, over which an adhesion tape (Nitto Tape #29) was placed, and the bondability was calculated by the number of unit sections (1 cm$^2$) left after peeling the tape off.
  great bondability
Δ medium bondability
4. Water absorption variation - increment in the weight after the lapse of 30 days under the condition of 45° C. and 90 RH%.
5. C/N variation - the relative value for C/N ratio to the initial value 100 after the lapse of 30 days under condition of 45° C. and 90 RH%.

It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. An optical information recording carrier comprising:
   a substrate made of transparent thermoplastic resin, provided that the substrate is not made of polymethylmethacrylate;
   a high density information recording layer made of rare earth-transition metal amorphous alloy, deposited on a surface of said substrate; and
   a thin film layer having a thickness of from 100 to 2000 angstroms, made of a non-alkali inorganic glass which is a mixture of two or more inorganic oxides and formed between said substrate and said high density information recording layer.

2. The optical information recording carrier as defined in claim 1, wherein a surface protection layer made of inorganic glass is further formed on the surface of the high density information recording layer at the side opposite to the layer of inorganic glass.

3. The optical information recording carrier as defined in claim 1, wherein the substrate made of transparent plastic is polycarbonate resin.

4. The optical information recording carrier as defined in claim 1, wherein an outer surface protection layer made of inorganic glass is further formed on the outer surface of the transparent plastic substrate at the side opposite to the recording layer.

* * * * *